US012591089B2

(12) United States Patent
Liu et al.

(10) Patent No.: US 12,591,089 B2
(45) Date of Patent: Mar. 31, 2026

(54) FRONT LIGHT MODULE AND DISPLAY DEVICE

(71) Applicant: TPK Advanced Solutions Inc., Xiamen (CN)

(72) Inventors: Sheng Fa Liu, Taoyuan City (TW); Shun Long Lin, Xiamen City (CN); Po Yu Hsiao, Taoyuan City (TW); Chin Hui Lee, Taipei City (TW)

(73) Assignee: TPL Advanced Solutions Inc., Xiamen (CN)

( * ) Notice: Subject to any disclaimer, the term of this patent is extended or adjusted under 35 U.S.C. 154(b) by 0 days.

(21) Appl. No.: 19/231,732

(22) Filed: Jun. 9, 2025

(65) Prior Publication Data

US 2025/0389886 A1      Dec. 25, 2025

(51) Int. Cl.
*F21V 8/00* (2006.01)
*G02F 1/1335* (2006.01)

(52) U.S. Cl.
CPC ......... *G02B 6/0058* (2013.01); *G02B 6/0036* (2013.01); *G02B 6/0068* (2013.01); *G02F 1/133616* (2021.01)

(58) Field of Classification Search
CPC ... G02B 6/0036; G02B 6/0058; G02B 6/0068
USPC ........................................ 362/612
See application file for complete search history.

(56) References Cited

U.S. PATENT DOCUMENTS 5,093,765 A      3/1992  Kashima et al.
2006/0062016 A1   3/2006  Dejima et al.

2016/0085018 A1    3/2016  Park et al.
2022/0099882 A1 *  3/2022  Wen ..................... G02B 6/0055
(Continued)

FOREIGN PATENT DOCUMENTS

CN        108519637 A     9/2018
JP       2004228092 A     8/2004
(Continued)

OTHER PUBLICATIONS

Chang, H.-C. (2007). "Optimal design of LED backlight modules for LCD panels" (Master's thesis). Nationai Tsing Hua University, Taiwan, 91 pages with statement of relevance.
(Continued)

*Primary Examiner* — Toan C Ly
(74) *Attorney, Agent, or Firm* — Cooper Legal Group, LLC

(57)              ABSTRACT

The present disclosure provides a front light module, which includes a light source and a light guide plate. The light source includes a linear light strip which includes a plurality of light-emitting diode elements. The light guide plate and the light source are disposed on a same plane. The light guide plate has two opposite surfaces, wherein one of the two surfaces has a plurality of microstructures, and the other of the two surfaces is free of any microstructures. A distribution density of the microstructures and distances of the microstructures from the light source satisfy the following equation: $y=Kx^n$, wherein y is the distribution density of the microstructures, measured in units of number/square millimeter; x is a distance between a sampling centerline and a side of the light guide plate closer to the light source, measured in units millimeter; K is a constant; and n is 1.5-3.0.

13 Claims, 8 Drawing Sheets

(56)                    References Cited

U.S. PATENT DOCUMENTS

2023/0215995 A1    7/2023  Lo et al.
2023/0251523 A1    8/2023  Hata et al.

FOREIGN PATENT DOCUMENTS

TW        200300513 A      6/2003
TW        201245818 A     11/2012
TW        201835654 A     10/2018
TW           I743572 B     10/2021

OTHER PUBLICATIONS

Fang. Y.-B. (2004). "LCD The Optimization of Optical Design for
LCD Backlight Module" (Master's thesis). National Cheng Kung
University, Taiwan, 107 pages with English abstract on page II.
Luo, T.-F. (2010), "Study of thin light-guide plate design: The
efficiency of wedge-type light-guide plate" (Master's thesis). National
Chiao Tung University, Taiwan, 63 pages with English abstract on
page ii.
European Search Report cited in EP25183054.3, mailed Oct. 14,
2025, 12 pages.
Lee, et al., "Design optimization for optical patterns in a light-guide
panel to improve illuminance and uniformity of the liquid-crystal
display", Feb. 1, 2009, vol. 48(2), 5 pages.

* cited by examiner

FRONT LIGHT MODULE AND DISPLAY DEVICE

FIELD OF DISCLOSURE

The present disclosure relates to a front light module and a display device, more specifically, a reflective display device and a front light module thereof.

DESCRIPTION OF RELATED ART

A reflective display device utilizes ambient light or room lighting, which is incident upon the display surface, reflected therefrom, and directed toward the viewer's eyes. This is different from conventional display technologies such as liquid crystal displays (LCDs) and self-emissive organic light emitting diodes (OLED) displays, where light is emitted directly toward the viewer's eyes, potentially causing eye strain. However, reflective display devices rely on external light sources and require sufficient ambient light to be readable. To enhance user convenience, most commercially available reflective display devices are now equipped with integrated reading lights to meet user's needs in a wider range of usage scenarios.

In 2012, Amazon released the $5^{th}$-generation Kindle Paperwhite, its first model equipped with a built-in reading light. To enable light propagating within the light guide plate to overcome total internal reflection and achieve uniform illumination of the electronic ink display, nano-imprinted structures were formed on the light guide plate to redirect the light out of the light guide plate and toward the display surface. Nevertheless, the prior art does not disclose how to distribute the nano-imprinted structures to achieve uniform illumination across the visible area of the electronic ink display. Although TW Patent Publication No. TWI743572B discloses the arrangement of multiple microstructures between the cover plate and the reflective display module, with their distribution density increasing in a direction away from the light source, it fails to provide a specific relationship between the distribution density and the distance from the light source.

In the technical field of transmissive display devices, Tosoh Quartz Co., Ltd. discloses in U.S. Pat. No. 5,093,765A that a functional relationship between the area covered by microstructures and the distance from the light source can be expressed as $y=ax^n$. This relationship pertains to the coverage area of microstructures rather than their distribution density relative to the distance from the light source. Additionally, a 2024 academic paper published by National Cheng Kung University (NCKU) stated that dot density is defined as the ratio of dot area to non-dot area. The study further indicated that, in a backlight module, a dot pattern with variable dot size yields better uniformity than one with variable dot density. However, the dot design in the aforementioned academic paper was not intended for use in front light modules. Furthermore a 2007 academic paper published by National Tsing Hua University (NTHU) discussed common design approaches for light guide plates in backlight modules, including wedge-shaped configurations and the addition of diffusion dots. The study noted that microstructures dot patterns near the light source typically exhibit lower density and smaller dot size. Nevertheless, this dot pattern design was also not developed for front light modules.

Although the use of microstructures in light guide plates of light-emitting diode (LED) backlight modules for LCDs is disclosed in the aforementioned patents and publications, the imaging principles of LCDs and reflective display devices differ significantly. Consequently, their illumination designs require distinct considerations based on their respective display technologies. For instance, a 2010 academic paper published by National Yang Ming Chiao Tung University (NYCU) discussed the fundamental components of backlight modules, including diffusion plates, prism plates, and light guide plates to convert light from the side-mounted light source into a planer light source. This conversion necessitates the use of various optical plates, such as diffusion plates and prism plates, to achieve the desired lighting effect.

To achieve an integrated design of the reading light and the reflective display device, the light source is positioned around the periphery area of the reflective display module. A key challenge in the field of the reflective display is how to ensure that the visible area receives soft and uniform illumination.

SUMMARY OF THE DISCLOSURE

The present disclosure provides a front light module comprising a light source and a light guide plate. The light source includes a linear light strip composed of a plurality of light-emitting diode (LED) elements. The light guide plate and the light source are arranged substantially on the same plane. The light guide plate has two opposite surfaces; one of the surfaces is formed with a plurality of microstructures, while the other surfaces is free of any microstructures. Within a visible area of the front light module, the distribution density of the microstructures and distances from the microstructures to the light source satisfy the following equation: $y=Kx^n$, wherein y represents the distribution density of the microstructures, measured in units of number per square millimeter (number/mm$^2$); x represents a distance from a sampling centerline to a side of the light guide plate closer to the light source, measured in millimeter (mm); K is a constant; and n is a value ranging from 1.5 to 3.0. Among the microstructures, those located at one end of the light guide plate farther from the light source may have an occupied area greater than those located at a second end of the light guide plate closer to the light source. Alternatively, the microstructures located at the one end of the light guide plate farther from the light source may have an occupied area equal to that of the microstructures located at the second end of the light guide plate closer to the light source. Alternatively, the microstructures located at the second end of the light guide plate closer to the light source may have an occupied area greater than those located in a central region between the two ends of the light guide plate, and the microstructures in the central region between the two ends of the light guide plate may have an occupied area equal to that of the microstructures located at the end farther from the light source.

In some embodiments, the two surfaces are respectively an upper surface and a lower surface, wherein the upper surface includes a plurality of microstructures, and the plurality of microstructures comprise at least one concave-type microstructure recessed from the upper surface toward the lower surface.

In some embodiments, the two surfaces are respectively an upper surface and a lower surface, wherein the lower surface includes a plurality of microstructures, and the plurality of microstructures comprise at least one convex-type microstructure protruding downward from the lower surface.

In some embodiments, the plurality of microstructures comprises a gradually varying geometry along an incident direction from the light source.

In some embodiments, the plurality of microstructures comprise a non-gradually varying geometry along an incident direction from the light source.

In some embodiments, each of the microstructures comprises a light-facing surface and an opposite light-facing surface, wherein the area of the light-facing surface is smaller than or equal to the area of the opposite light-facing surface.

In some embodiments, the microstructures are selected from the group consisting of cylindrical, blade-shaped, conical, pyramidal, grating-type microstructures, or combination thereof.

The present disclosure also provides a display device comprising a cover plate, a front light module, a reflective display module, and a housing. The front light module is disposed below the cover plate. The front light module comprises a light source and a light guide plate. The light source comprises a linear light strip having a plurality of light-emitting diode (LED) elements. The light guide plate and the light source are disposed substantially on the same plane. The light guide plate has two opposite and substantially parallel surfaces, one of which includes a plurality of microstructures, while the other surfaces is free of microstructures. Within a visible area, the distribution density of the microstructures and distances from the microstructures to the light source satisfy the following equation: $y=Kx^n$ wherein y represents the distribution density of the microstructures, measured in units of number per square millimeter (number/mm$^2$); x represents a distance from a sampling centerline to the side of the light guide plate closer to the light source, measured in millimeter; K is a constant; and n is a value ranging from 1.5 to 3.0. Among the microstructures, those located at one end of the light guide plate farther from the light source may have an occupied area greater than that of those located at a second end closer to the light source. Alternatively, the microstructures located at the one end farther from the light source may have an occupied area equal to that of those located at the second end closer to the light source. Alternatively, the microstructures located at the second end closer to the light source may have an occupied area greater than that of those located in the central region between two ends of the light guide plate, and the microstructures located in a central region between the two ends of the light guide plate may have an occupied area equal to that of the microstructures located at the one end farther from the light source. The reflective display module is disposed below the front light module. The housing includes a rectangular bottom surface and four sidewalls connected to the rectangular bottom surface. The bottom surface and the four sidewalls together define an accommodation space, which is configured to house the reflective display module, the front light module, and the cover plate.

In some embodiments, each of the microstructure comprises a gradually varying geometry along an incident direction from the light source.

In some embodiments, each of the microstructure comprises a non-gradually varying geometry along an incident direction from the light source.

BRIEF DESCRIPTION OF THE DRAWINGS

When reading the drawings of the present disclosure, it is recommended to understand the various aspects of the disclosure as described below. It should be noted that, in accordance with standard industry practice, various feature dimensions may not be drawn to scale. Furthermore, to improve clarity of discussion, certain feature dimensions may be arbitrarily enlarged or reduced. In addition, for the purpose of simplifying the drawings, conventional structures and components may be illustrated in simplified schematic manner.

Figure 1:
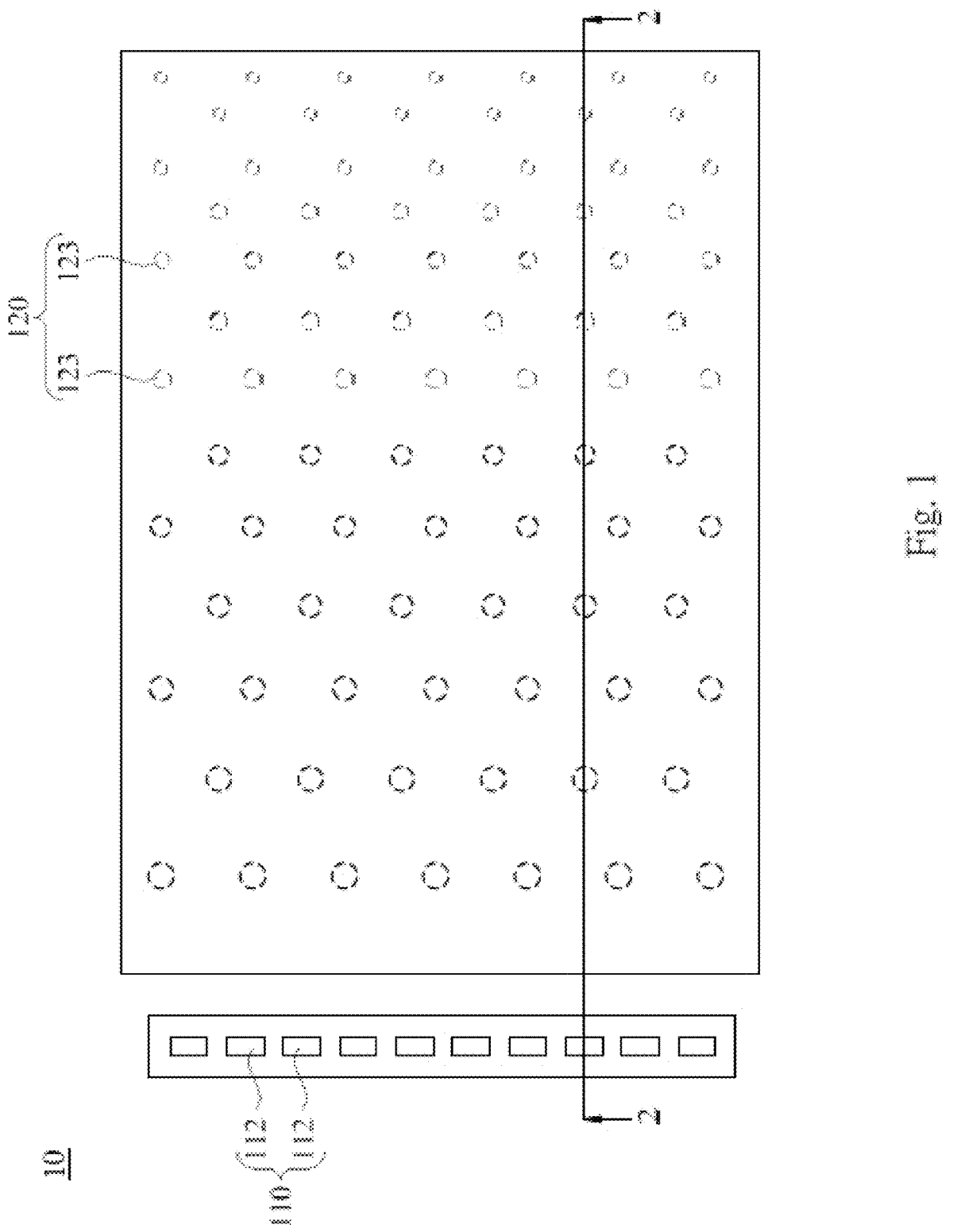
FIG. 1 is a top view schematic diagram of a front light module according to some embodiments of the present disclosure.

DETAILED DESCRIPTION OF THE
PREFERRED EMBODIMENTS

To provide a more detailed and complete description of the present disclosure, illustrative descriptions of various embodiments are provided below. These descriptions are not intended to limit the embodiments of the present disclosure and may be combined or substituted with one another when advantageous, and additional embodiments may be incorporated without further elaboration.

Spatially relative terms, such as "upper" and "lower", may be used in the present disclosure to describe the relationship between one element and another as illustrated in the drawings. In addition to the orientations depicted in the figures, such spatially relative terms are intended to encompass different orientations of the device during use or operation. For example, the device may be rotated 90 degrees or orientated in other directions. Therefore, spatially relative terms used herein should be interpreted accordingly. Unless otherwise specified, the same reference numerals across different figures refer to the same or similar elements formed of the same or similar materials and by the same or similar methods.

As used in the present disclosure, terms such as "about," "approximately," "near," "substantially," or "essentially" are intended to include the stated values or characteristics, as well as deviations from such values or characteristics that would be understood by a person skilled in the art. For example, considering measurement variations or tolerances, these terms may refer to values within one or more standard deviations (e.g., within ±30%, ±20%, ±15%, ±10% or ±5%), or to deviations that are practically encompassed in real-world applications (e.g., the term "substantially parallel"

may refer to surfaces that are nearly parallel in practice, even if not perfectly parallel in theory).

Figure 2:
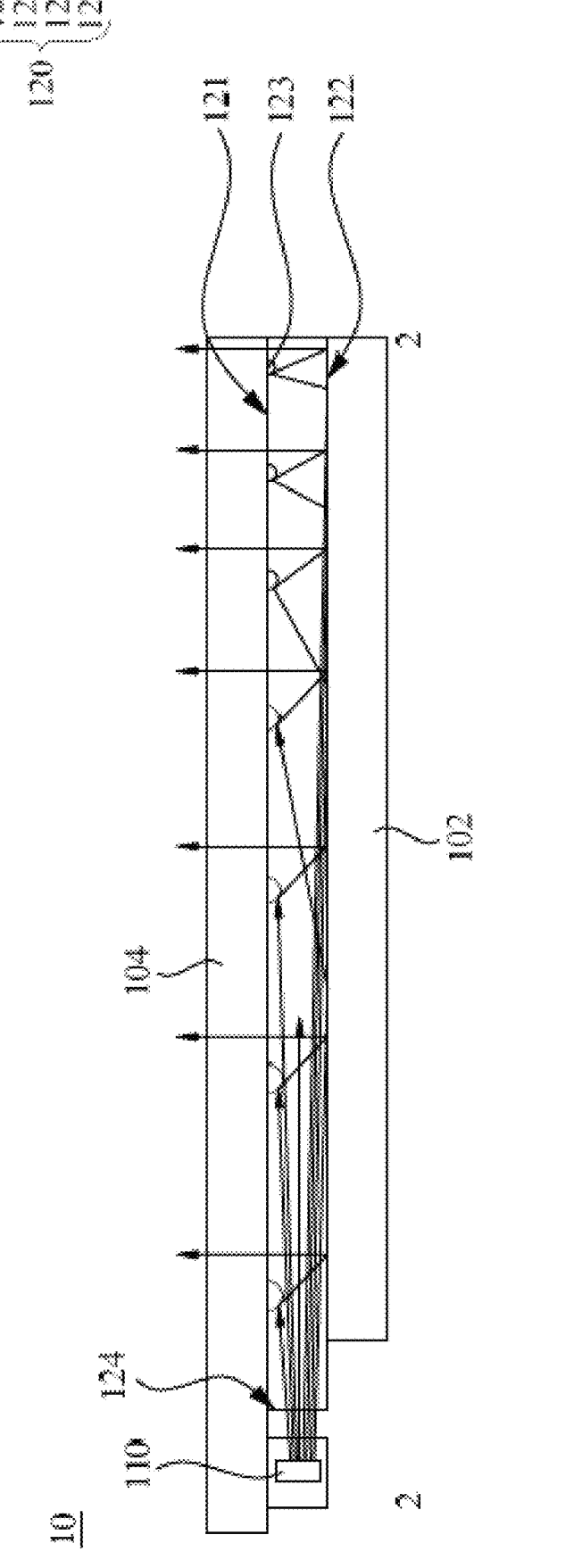
FIG. 2 is a cross-sectional schematic diagram of a front light module according to one embodiment of the present disclosure.
Figure 3:
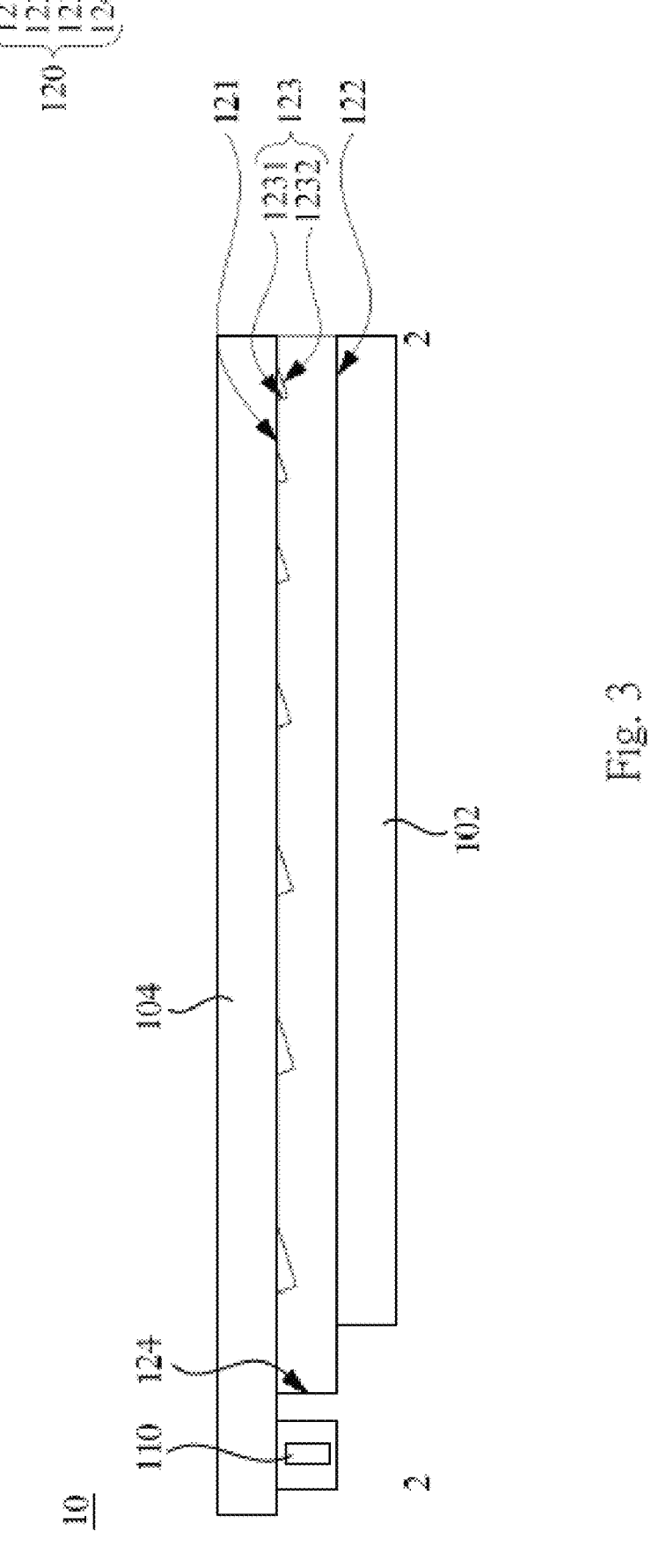
FIG. 3 is a cross-sectional schematic diagram of the front light module according to another embodiment of the present disclosure.
Figure 4:
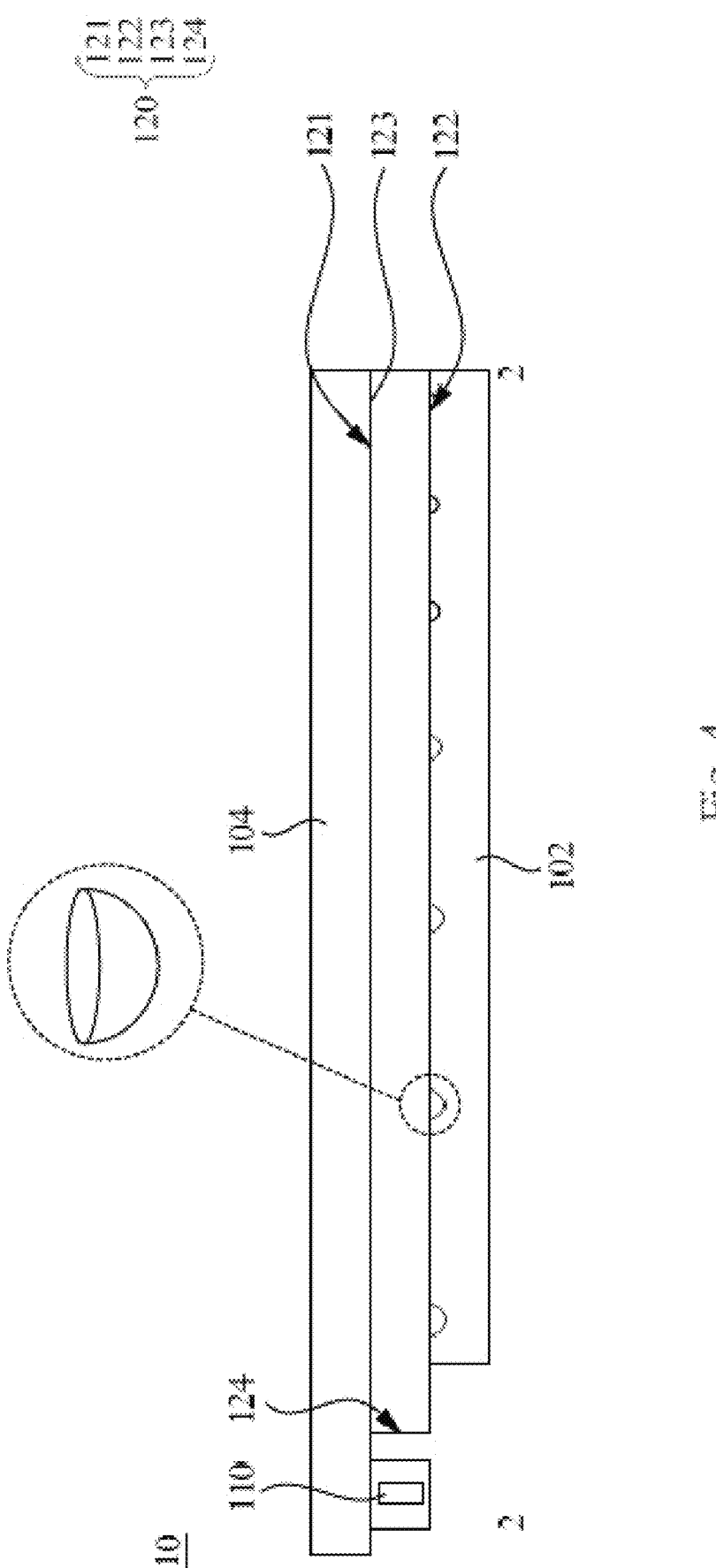
FIG. 4 is a cross-sectional schematic diagram of the front light module according to yet other embodiment of the present disclosure.
Figure 5:
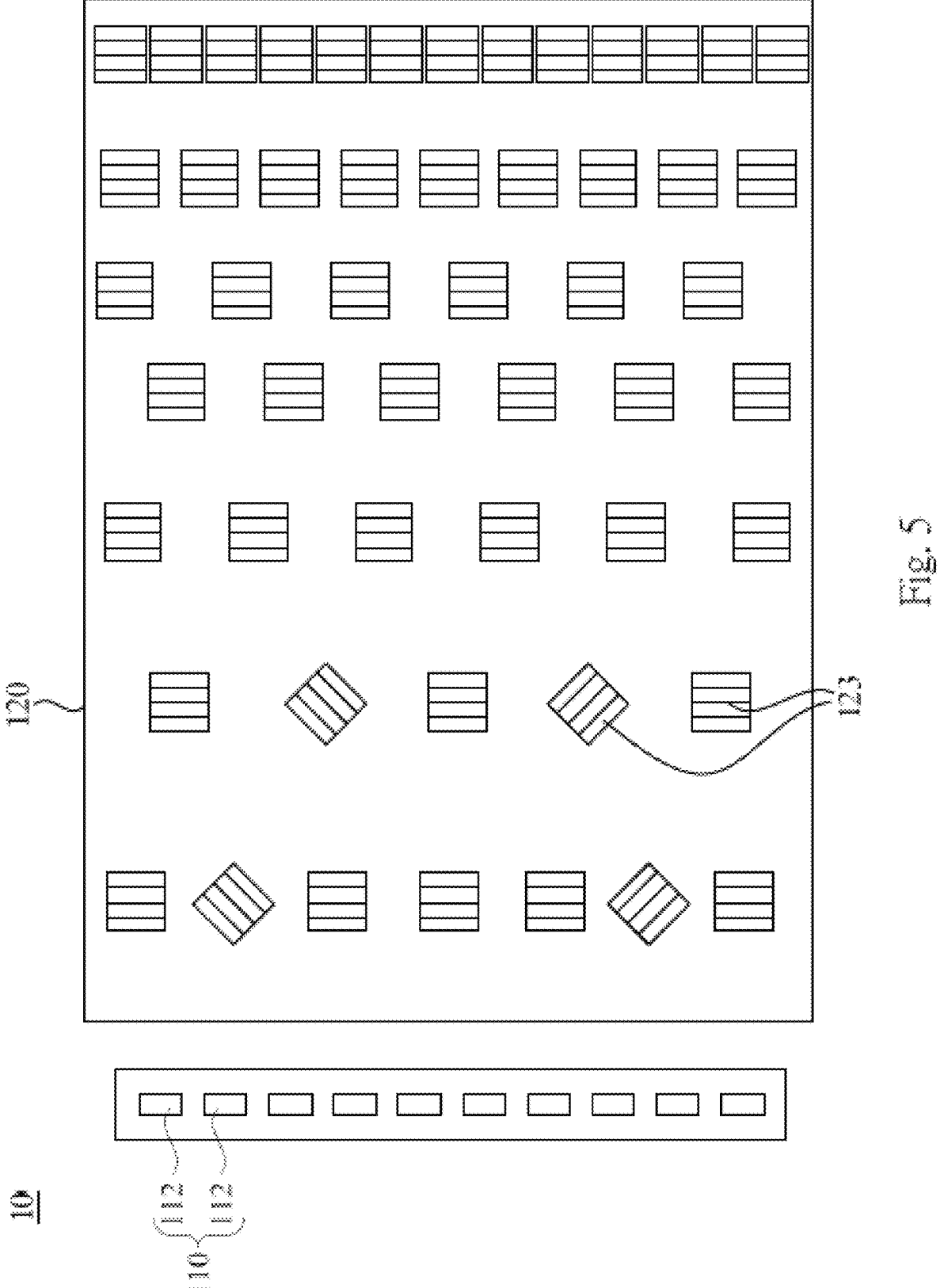
FIG. 5 is a top view schematic diagram of a front light module according to another embodiment of the present disclosure.

FIG. 1 is the top view schematic diagram of the front light module according to some embodiments of the present disclosure. FIG. 2 is a cross-sectional schematic diagram taken along the cutting plane line 2-2 in FIG. 1. FIG. 3 and FIG. 4 are cross-sectional schematic diagrams of the front light module according to various embodiments of the present disclosure. FIG. 5 is a top view schematic diagram of the front light module according to another embodiment of the present disclosure. The present disclosure provides a front light module, such as the front light module 10 shown in FIG. 1 and in FIG. 2. The front light module 10 comprises a light source 110 and a light guide plate 120. The light source 110 comprises a linear light strip having a plurality of light-emitting diode (LED) elements 112. The light source 110 may further comprise a circuit board (not shown) electrically connected to the plurality of LED elements 112. The circuit board may be a flexible circuit board (FCB) or a printed circuit board (PCB), but the disclosure is not limited thereto. FIG. 1 schematically illustrates ten LED elements 112, which are arranged in spaced intervals along and parallel to a side of the light guide plate 120. More specifically, when the front light module 10 is assembled into a display device (shown as a display device 70 shown in FIG. 7), the ten LED elements 112 are located in the peripheral area of the display device. In other embodiments, the number, arrangement, and the relative positioning to the light guide plate 120 may vary as needed and are not limited to the configuration shown in FIG. 1. In some embodiments, the front light module 10 further comprises an electronic ink panel 102 disposed below the light guide plate 120. Specifically, the electronic ink panel 102 has dimensions smaller than those of the light guide plate 120. That is, the area of the electronic ink panel 102 in the vertical direction is smaller than the area of the light guide plate 120 in the same direction. In some embodiments, the front light module 10 further comprises a protective layer 104 disposed over the light source 110 and the light guide plate 120. The protective layer 104 comprises a light-transmissive insulating material, such as glass or other similar materials.

The light guide plate 120 and the light source 110 may be disposed on the same plane (at the same level), as shown in FIG. 2. Specifically, the light guide plate 120 comprises two surfaces, the two surfaces being opposing and substantially parallel, namely an upper surface 121 and a lower surface 122. One of the two surfaces 121 or 122 includes a plurality of microstructures 123, while the other of the two surfaces is free of any microstructures 123. It is understood that the light guide plate 120 includes the upper surface 121 and the lower surface 122, which are opposite to each other, and further includes a light-incident surface 124 adjacent to the light source 110. The distribution density of the microstructures 123 and distances of the microstructures 123 from the light source 110 satisfy the following equation: $y = Kx^n$, wherein y represents the distribution density of the microstructures 123, measured in units of number per square millimeter (number/mm$^2$); x represents the distance from a sampling centerline to the side of the light guide plate 120 that is closer to the light source 110, measured in millimeter (mm); K is a constant; and n is a value ranging from 1.5 to 3.0. More specifically, among the microstructures 123, those located at the end of the light guide plate 120 farther from the light source 110 may have an occupied area on the light guide plate 120 greater than that of the microstructures 123 located at the end of the light guide plate 120 closer to the light source 110. Alternatively, among the microstructures 123, those located at the end of the light guide plate 120 farther from the light source 110 may have an occupied area equal to that of the microstructures 123 located at the end of the light guide plate 120 closer to the light source 110. Alternatively, among the microstructures 123, those located at the end of the light guide plate 120 closer to the light source 110 may have an occupied area greater than that of the microstructures 123 located in the central region between two ends of the light guide plate 120, and the microstructures 123 located in the central region between the two ends of the light guide plate 120 may have an occupied area equal to that of the microstructures 123 located at the end farther from the light source 110. The term "occupied area" refers to the contact area between each microstructure 123 and the light guide plate 120.

Figure 6:
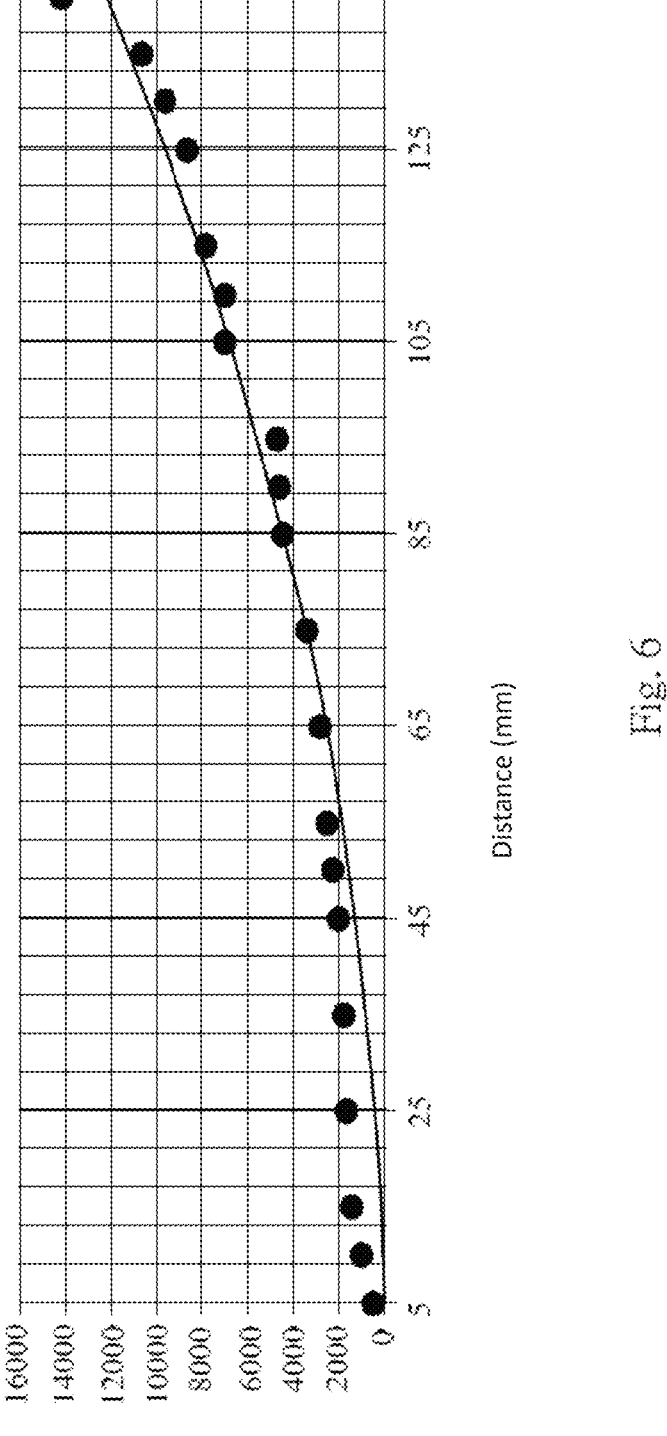
FIG. 6 is a regression diagram showing the relationship between the number of microstructures per unit area and the distance from a sampling centerline to the side of the light guide plate closer to the light source, according to some embodiments of the present disclosure.

FIG. 6 is a regression diagram showing the relationship between the number of microstructures 123 per unit area and the distance from the sampling centerline to the side of the light guide plate 120 closer to the light source 110, according to some embodiments of the present disclosure. In one embodiment, starting from the end of the light guide plate 120 closer to the light source 110, sampling was performed in the X direction at intervals of 5 millimeters (mm), with the first sampling point located within the visible area. Each sample was taken over an area of 0.307 mm×0.225 mm. Within the above sampling range, 20 data points were collected, representing the number of microstructures per unit area and the distance from the sampling centerline to the side of the light guide plate closer to the light source. The data is listed in Table 1. Based on this data, a regression analysis was performed, and the resulting regression curve is shown in FIG. 6. The fitted parameters were K is 0.73837739±0.632885658850728 and n is 1.95997939700337±0.179119441757646.

TABLE 1

| Distance in X direction (mm) | Number of microstructures/mm$^2$ |
|---|---|
| 5 | 4 7 8 |
| 1 0 | 9 5 5 |
| 1 5 | 1 4 3 3 |
| 2 5 | 1 6 6 5 |
| 3 5 | 1 7 8 1 |
| 4 5 | 2 1 1 4 |
| 5 0 | 2 1 8 6 |
| 5 5 | 2 4 7 6 |
| 6 5 | 2 7 8 0 |
| 7 5 | 3 2 5 7 |
| 8 5 | 4 4 4 4 |
| 9 0 | 4 5 3 1 |
| 9 5 | 4 6 0 4 |
| 1 0 5 | 6 9 4 9 |
| 1 1 0 | 7 0 0 7 |
| 1 1 5 | 7 8 0 3 |
| 1 2 5 | 8 5 5 6 |
| 1 3 0 | 9 6 4 2 |
| 1 3 5 | 1 0 6 4 1 |
| 1 4 0 | 1 4 1 8 7 |

Referring to FIG. 2, light emitted from the light source 110 enters the light guide plate 120 through the light-incident surface 124. The light undergoes total internal reflection between the upper surface 121 and the lower surface 122, and propagates within the light guide plate 120 toward the end father from the light source 110. As the light propagates through the light guide plate 120 and encounters the microstructures 123, a direction of the light is altered. As a result, when light reaches the surface opposite to the plane on which the microstructures 123 are located, the angle of incidence changes such that total internal reflection no longer occurs. Consequently, the light exits the light guide plate 120 and is directed toward the electronic ink panel 102. Since the light intensity gradually decreases as the distance from the light source 110 increases during propagation through the light guide plate 120, compensatory design is necessary. To maintain uniform illumination of the electronic ink panel 102 by the front light module 10, when the microstructures 123 are designed in accordance with the aforementioned equation, the microstructures 123 can be configured to compensate for the gradual reduction in optical energy (or intensity) within the light guide plate 120 and guide the light downward toward the electronic ink panel. This allows the electronic ink panel 102 to receive substantially uniform illumination, even at different distances from the light source 110.

Referring again to FIG. 2, in some embodiments, the two opposite surfaces of the light guide plate 120 are the upper surface 121 and the lower surface 122. The upper surface 121 includes microstructure 123, and each of the microstructures 123 is a concave-type microstructure recessed from the upper surface 121 toward the lower surface 122. In embodiments in which the microstructures 123 are concave-type microstructures, each microstructure 123 has a gradually varying geometry along the incident direction of the light from the light source 110, as shown in FIG. 2.

In embodiments where the microstructures 123 are concave-type microstructures 123, each microstructure 123 may have a non-gradually varying geometry along the incident direction of the light from the light source 110, as shown in FIG. 3. As used herein "non-gradually varying geometry" refers to any shape that comprises straight lines, such as rectangular, blade-shaped, conical, or pyramidal shapes. In some embodiments, the microstructures 123 are arranged in a grating pattern. For example, a grating pattern may be formed by arranging a plurality of conical microstructures in an ordered configuration. In such embodiments, every microstructure 123 includes a light-facing surface 1231 and an opposite light-facing surface 1232. The light-facing surface 1231 and the opposite light-facing surface 1232 each have substantially the same slope. More specifically, the light-facing surface 1231 of the microstructure 123 is an inclined plane, and the vertical distance from this inclined plane to the upper surface 121 of the light guide plate 120 increases in the direction away from the light source 110, as shown in FIG. 3. In other words, the light-facing surface 1231 of the microstructure 123 inclines in a direction away from the light source 110 toward the lower surface 122 of the light guide plate 120, that is, from the upper left to the lower right in the figure. The slope of the portion of the light-facing surface 1231 that is closer to the upper surface 121 is substantially the same as the slope of the portion closer to the lower surface 122. The opposite light-facing surface 1232 of the microstructure 123 is also an inclined plane, and the vertical distance from this inclined plane to the upper surface 121 of the light guide plate 120 decreases in the direction away from the light source 110. The slope of the portion of the opposite light-facing surface 1232 that is closer to the upper surface 121 is substantially the same as the slope of the portion closer to the lower surface 122, as shown in FIG. 3. In other words, the opposite light-facing surface 1232 inclines in a direction away from the light source 110 toward the upper surface 121 of the light guide plate 120, that is, from the lower left to the upper right in the figure. In some embodiments, as shown in the cross-sectional view of FIG. 3, the absolute value of the angle between the light-facing surface 1231 of the microstructure 123 and the upper surface 121 of the light guide plate 120 is greater than the absolute value of the angle formed between the opposite light-facing surface 1232 and the upper surface 121 of the light guide plate 120. In some embodiments, the area of the light-facing surface 1231 is smaller than the area of the opposite light-facing surface 1232.

Referring to FIG. 4, in some embodiments, the two opposite surfaces of the light guide plate 120 are the upper surface 121 and a lower surface 122. The lower surface 122 includes the microstructures 123, and each of the microstructures 123 is a convex-type microstructure protruding downward from the lower surface 122. In embodiments where the microstructures 123 are convex-type microstructures, each microstructure 123 is hemispherical, as shown in the enlarged schematic view in FIG. 4.

In embodiments where the microstructures 123 are convex-type microstructures, each microstructure 123 has a non-gradually varying geometry along the incident direction of the light from the light source 110. For example, the microstructures 123 may include grating-type microstructures, as illustrated in FIG. 5. In the embodiment shown in FIG. 5, the lines within the microstructures 123 represent a diffractive surface relief pattern, such as a grating groove (or peaks of the microstructures). These microstructures 123 may vary in size, shape, internal structure, material, or alignment. Additionally, these microstructures 123 may effectively guide the incident light using substructures of different types, such as curved, linear, or wavy forms. In embodiments where the lower surface 122 of the light guide plate 120 comprises convex-type microstructures 123, the design disrupts the total internal reflection of light and induces light scattering during propagation of the light away from the light source 110, thereby guiding the light out of the light guide plate 120 to achieve uniform incident light intensity across the visible area.

In one embodiment, the plurality of microstructures 123 may be formed by etching the light guide plate 120. In another embodiment, the plurality of microstructures 123 may be formed on the upper surface 121 or the lower surface 122 of the light guide plate 120 by thermal embossing and/or nanoimprinted.

In some embodiments, the light guide plate 120 may be made of materials such as poly(methyl methacrylate) (PMMA, also known as acrylic), polyolefin, polycarbonate (PC), styrene-methacrylate copolymer (MS), Polystyrene (PS), Styrene-olefin copolymer, or derivatives thereof. In other embodiments, the light guide plate 120 is made from materials other than those listed above, as long as the material is capable of guiding light. The light guide plate 120 may also contain various additives, such as ultraviolet (UV) stabilizer, UV absorber, thermal stabilizer, antioxidant, or light-diffusing particles, to meet different light-guide performance requirements. In other embodiments, the additives are not limited to those listed above and may include other agents added as needed to achieve desired functionalities (e.g., enhancing light extraction efficiency or reducing heat generation). Of course, one or more of the listed additives may also be incorporated.

Figure 7:
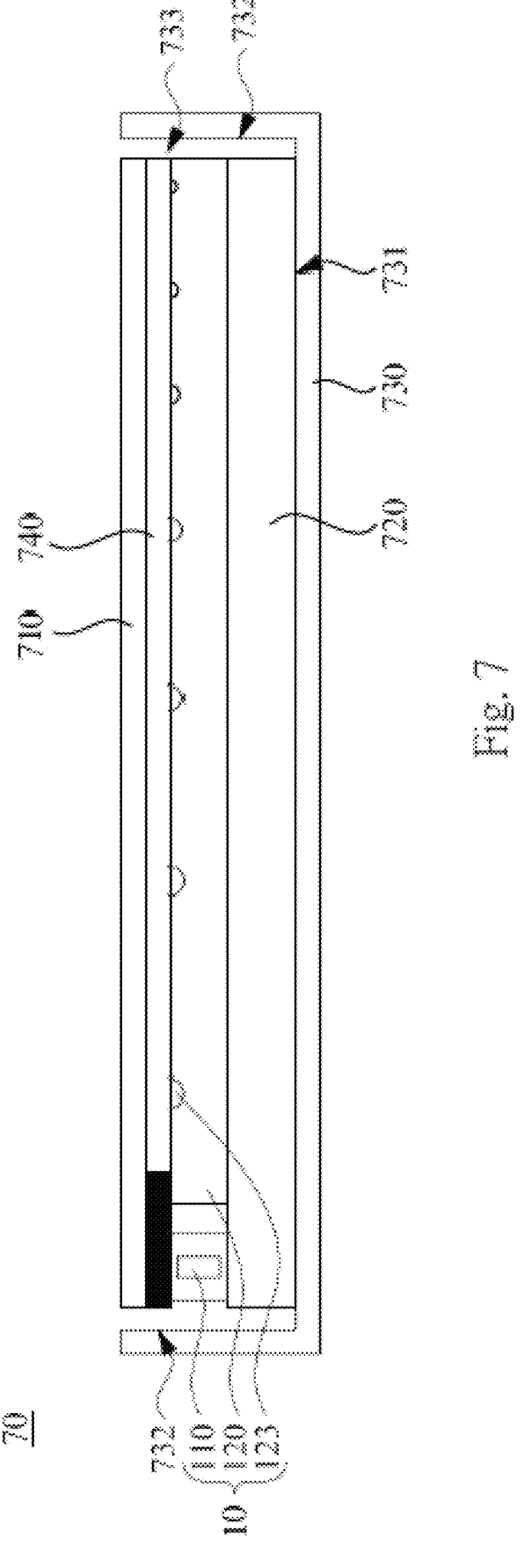
FIG. 7 is a cross-sectional schematic diagram of a display device according to some embodiments of the present disclosure.
Figure 8:
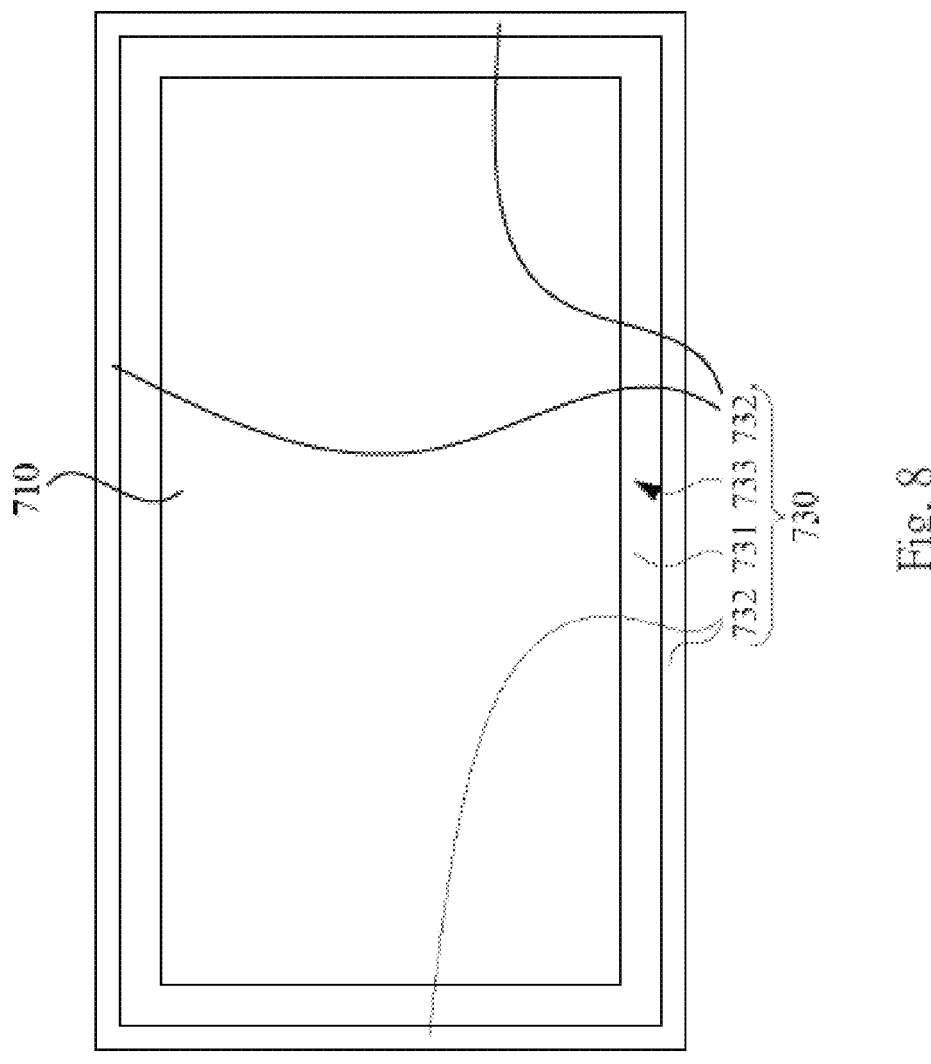
FIG. 8 is a top view schematic diagram of a display device according to some embodiments of the present disclosure.

FIG. 7 is a cross-sectional schematic diagram of a display device according to the present disclosure. FIG. 8 is a top view schematic diagram of a display device according to some embodiments of the present disclosure. The present disclosure further provides a display device, such as the display device 70 illustrated in FIG. 7 and FIG. 8. For example, the display device 70 may be an electronic device employing a reflective display modules, such as a cholesteric liquid crystal display (ChLCD), an electrophoretic display (EPD), an electronic ink display, an electronic paper display (EPD), an electrowetting display (EWD), an electrofluid display, an electrochromic display, a bistable display, or an interferometer modulator display, among others. The display device 70 comprises a cover plate 710, a front light module 10, a reflective display module 720, and a housing 730.

Specifically, the cover plate 710 serves as a protection cover for the reflective display module 720. To avoid obstructing the display image, the cover plate 710 is made of a light-transmissive material. For example, the material of the cover plate 710 may include glass and plastic, although the present disclosure is not limited thereto. In some embodiments, the cover plate 710 may be formed by combining multiple layers, such as multiple light-transmissive layers and a light-blocking layer. The transmittance of each light-transmissive layer may be the same or different. The light-blocking layer is disposed in a non-visible area. For simplicity, the cover plate 710 is illustrated as single layer in FIG. 7.

The front light module 10 is disposed below the cover plate 710. Specifically, the front light module 10 comprises a light source 110 and a light guide plate 120, as shown in FIG. 1 and FIG. 2. The light source 110 comprises a linear light strip comprising a plurality of light-emitting diode (LED) elements 112. The light guide plate 120 and the light source 110 are disposed on the same plane. The light guide plate 120 includes two opposite surfaces 121 and 122. One of the surfaces includes a plurality of microstructures 123, while the other of the two surfaces is a smooth surface. Within the visible area, the distribution density of the microstructures 123 and distances of the microstructures from the light source 110 satisfy the following equation: $y=Kx^n$, wherein y represents the distribution density of the microstructures 123, measured in units of number per square millimeter (number/mm$^2$); x represents the distance from each microstructure 123 to the light source 110; K is a constant, and n is a value ranging from 1.5 to 3.0. It is worth noting that, among the microstructures 123, the portion located closer to the light source 110 may have a larger occupied area on the light guide plate 120 than the portion located farther from the light source 110. Alternatively, all the microstructures 123 may have the same occupied area on the light guide plate 120.

In some embodiments, the two opposite surfaces of the light guide plate 120 are an upper surface 121 adjacent to the cover plate 710 and a lower surface 122 adjacent to the reflective display module 720. The upper surface 121 has a plurality of microstructures 123, and each of the microstructures 123 is a concave-type microstructure recessed from the upper surface 121 toward the lower surface 122. Additional detailed features have been previously described; please refer to the descriptions provided earlier, such as those in FIG. 1 though FIG. 3, which will not be repeated here for brevity.

In some embodiments, the two opposite surfaces of the light guide plate 120 are an upper surface 121 adjacent to the cover plate 710 and a lower surface 122 adjacent to the reflective display module 720. The lower surface 122 includes a plurality of microstructures 123 and each of the microstructures 123 is a convex-type microstructure protruding downward from the lower surface 122. Additional detailed features have been previously described; please refer to the descriptions provided earlier, such as those in FIG. 1 and FIG. 4 through FIG. 6, which will not be repeated here for brevity.

Referring again to FIG. 7 and FIG. 8, the reflective display module 720 is disposed below the front light module 10. For example, the reflective display module 720 may include a cholesteric liquid crystal display module, an electrophoretic display module, an electronic ink display module, an electronic paper display module, an electrowetting display module, an electrofluid display module, an electrochromic display module, a bistable display module, an interferometer modulator display module, or other types of reflective display modules. For simplicity, the specific structure of the reflective display module 720 is not described in detail herein, and such omission does not affect the technical scope of the present disclosure.

The housing 730 has a rectangular bottom surface 731 and four sidewalls 732 connected to the rectangular bottom surface 731. The rectangular bottom surface 731 and four sidewalls 732 together define an accommodation space 733, which is configured to house a reflective display module 720, a front light module 10, and a cover plate 710. In other words, the housing 730 is frame-shaped. Since the housing 730 is used to contain the above components, its dimensions differ from the reflective display module 720. In addition, the thickness of the housing 730 may vary depending on whether the various internal components are stacked. The reflective display module 720, the front light module 10, the cover plate 710, and the housing 730 are fabricated through different manufacturing processes and are assembled together. Therefore, to prevent the components and the housing from separating due to vibration or impact, adhesive elements are provided between the components. In some embodiments, the adhesive materials may be an optical clear adhesive (OCA) or optical clear resin (OCR), though the present disclosure is not limited thereto. For example, as shown in FIG. 7, an adhesive element 740 is further disposed between the front light module 10 and the cover plate 710. Although only the adhesive element 740 between the front light module 10 and the cover plate 710 is illustrated in FIG. 7, adhesive elements are also present between other components but are not shown. The omission of those adhesive elements does not affect the scope or integrity of the present disclosure.

In summary, due to the design of microstructures on the surface of the light guide plate of the front light module and the distribution density of the microstructures and distances of the microstructures from the light source satisfying the equation: $y=Kx^n$, uniform illumination can be achieved.

The present disclosure has been described in considerable detail through various embodiments; however, other embodiments may also be feasible. Therefore, the scope and spirit of the appended claims should not be limited by the specific descriptions contained herein. Modifications and alternations may be made by those skilled in the art without departing from the scope and spirit of the present disclosure. So long as such modifications and alterations fall within the scope of the appended claims, such modifications and alterations are to be considered as encompassed by the present disclosure.

COMPONENT SYMBOL

10: Front light module
102: Electronic ink panel
104: Protective layer
110: Light source

112: Light-emitting diode (LED) elements
120: Light guide plate
121: Upper surface
122: Lower surface
123: Microstructure
124: Incident surface
1231: Light-facing surface
1232: Opposite light-facing surface
2-2: Cutting plane line
70: Display device
710: Cover plate
720: Reflective display module
730: Housing
731: Bottom surface
732: Sidewall
733: Accommodation space
740: Adhesive component

What is claimed is:

1. A front light module comprising:

a light source, comprising a linear light strip comprising a plurality of light-emitting diode elements; and a light guide plate disposed substantially on a same plane as the light source, the light guide plate comprising two surfaces, the two surface being opposing and substantially parallel, wherein one of the two surfaces comprises a plurality of microstructures and the other of the two surfaces is free of any microstructures;

wherein, within a visible area of the front light module, a distribution density of the plurality of microstructures and distances from the plurality of microstructures to the light source satisfy the following equation: $y=Kx^n$, wherein, y represents the distribution density of the plurality of microstructures, measured in units of number per square millimeter, x represents a distance from a sampling centerline to a side of the light guide plate closer to the light source, measured in units millimeter;

K is a constant, and n is a value ranging from 1.5 to 3.0;

wherein, each of the plurality of microstructures located at one end of the light guide plate farther from the light source has an occupied area greater than that of each of the plurality of microstructures located at a second end of the light guide plate closer to the light source; or each of the plurality of microstructures located at the one end of the light guide plate farther from the light source has an occupied area equal to that of each of the plurality of microstructures located at the second end of the light guide plate closer to the light source; or each of the plurality of microstructures located at the second end of the light guide plate closer to the light source has an occupied area greater than that of each of the plurality of microstructures located in a central region between the one end and the second end of the light guide plate, and each of the plurality of microstructures located in the central region between the one end and the second end of the light guide plate has an occupied area equal to that of each of the plurality of microstructures located at the one end of the light guide plate farther from the light source.

2. The front light module according to claim 1, wherein the two surfaces are an upper surface and a lower surface, the upper surface comprises the plurality of microstructures, and the plurality of microstructures comprise at least one concave-type microstructure recessed from the upper surface toward the lower surface.

3. The front light module according to claim 2, wherein the plurality of microstructures comprise at least one microstructure having a gradually varying geometry along an incident direction from the light source.

4. The front light module according to claim 2, wherein the plurality of microstructures comprise at least one microstructure having a non-gradually varying geometry along an incident direction from the light source.

5. The front light module according to claim 4, wherein the at least one microstructure has a light-facing surface and an opposite light-facing surface, and an area of the light-facing surface is smaller than or equal to an area of the opposite light-facing surface.

6. The front light module according to claim 1, wherein the two surfaces are an upper surface and a lower surface, the lower surface comprises the plurality of microstructures, and the plurality of microstructures comprise at least one convex-type microstructure protruding downward from the lower surface.

7. The front light module according to claim 6, wherein each of the plurality of microstructures is selected from the group consisting of a cylindrical shape, a blade shape, a conical shape, a pyramidal shape, a grating-type microstructure, or a combination thereof.

8. The front light module according to claim 6, wherein the plurality of microstructures comprise at least one microstructure having a gradually varying geometry along an incident direction from the light source.

9. The front light module according to claim 6, wherein the plurality of microstructures comprise at least one microstructure having a non-gradually varying geometry along an incident direction from the light source.

10. The front light module according to claim 9, wherein the at least one microstructure has a light-facing surface and an opposite light-facing surface, and an area of the light-facing surface is smaller than or equal to an area of the opposite light-facing surface.

11. A display device, comprising:

a cover plate;

a front light module disposed below the cover plate, wherein the front light module comprises:

a light source, comprising a linear light strip comprising a plurality of light-emitting diode elements; and a light guide plate disposed substantially on a same plane as the light source, the light guide plate comprising two surfaces, the two surfaces being opposing and substantially parallel, wherein one of the two surfaces comprises a plurality of microstructures and the other of the two surfaces is free of any microstructures;

wherein, within a visible area, a distribution density of the plurality of microstructures and distances from the plurality of microstructures to the light source satisfy the following equation: $y=Kx^n$, wherein y represents the distribution density of the plurality of microstructures, measured in units number pre square millimeter;

x represents a distance from a sampling centerline to a side of the light guide plate closer to the light source, measured in units of millimeter;

K is a constant; and n is a value ranging from 1.5 to 3.0, wherein, each of the plurality of microstructures located at one end of the light guide plate farther from the light source has an occupied area greater than that of each of the plurality of microstructures located at a second end of the light guide plate closer to the light source; or each of the plurality of microstructures located at the one end of the light guide plate farther from the light source has an occupied area equal to that of each of the plurality of microstructures located at the second end of the light guide plate closer to the light source; or each of the plurality of microstructures located at the second end of the light guide plate closer to the light source has an occupied area greater than that of each of the plurality of microstructures located in a central region between the one end and the second end of the light guide plate, and each of the plurality of microstructures located in the central region between the one end and the second end of the light guide plate has an occupied area equal to that of each of the plurality of microstructures located at the one end of the light guide plate farther from the light source, a reflective display module disposed below the front light module; and a housing having a rectangular bottom surface and four sidewalls connected to the rectangular bottom surface, the rectangular bottom surface and the four sidewalls together defining an accommodating space, the accommodating space being configured to house the reflective display module, the front light module, and the cover plate.

12. The display device according to claim 11, wherein the plurality of microstructures comprise at least one microstructure having a gradually varying geometry along an incident direction from the light source.

13. The display device according to claim 11, wherein the plurality of microstructures comprise at least one microstructure having a non-gradually varying geometry along an incident direction from the light source.

* * * * *